US010478974B2

(12) United States Patent
Curhan et al.

(10) Patent No.: US 10,478,974 B2
(45) Date of Patent: Nov. 19, 2019

(54) END OF ARM TOOLS FOR SOFT ROBOTIC SYSTEMS

(71) Applicant: Soft Robotics, Inc., Bedford, MA (US)

(72) Inventors: Jeffrey Curhan, Warwick, RI (US); Craig Demello, Newfields, NH (US); Thomas Womersley, Newton, MA (US); William Gunner, Quincy, MA (US)

(73) Assignee: Soft Robtics, Inc., Bedford, MA (US)

( * ) Notice: Subject to any disclaimer, the term of this patent is extended or adjusted under 35 U.S.C. 154(b) by 0 days.

(21) Appl. No.: 16/188,921

(22) Filed: Nov. 13, 2018

(65) Prior Publication Data

US 2019/0084165 A1    Mar. 21, 2019

Related U.S. Application Data

(63) Continuation-in-part of application No. 16/160,580, filed on Oct. 15, 2018, and a continuation-in-part of
(Continued)

(51) Int. Cl.
| | |
|---|---|
| *B25J 15/12* | (2006.01) |
| *B25J 9/10* | (2006.01) |
| *B25J 15/02* | (2006.01) |
| *B25J 15/00* | (2006.01) |
| *B25J 9/14* | (2006.01) |

(Continued)

(52) U.S. Cl.
CPC ............ *B25J 15/12* (2013.01); *B25J 9/1005* (2013.01); *B25J 9/123* (2013.01); *B25J 9/142* (2013.01); *B25J 15/0023* (2013.01); *B25J 15/026* (2013.01); *B25J 15/0213* (2013.01); *B25J 15/103* (2013.01)

(58) Field of Classification Search
CPC ............... B25J 15/0004; B25J 15/0023; B25J 15/0052; B25J 15/024; B25J 15/0293; B25J 15/12; B25J 9/1005; B25J 9/123; B25J 9/142; B25J 9/144; B25J 11/0045
USPC ......................................... 294/2, 86.4, 119.3
See application file for complete search history.

(56) References Cited

U.S. PATENT DOCUMENTS

| 3,343,864 | A | * | 9/1967 | Baer ................... B25J 15/0009 294/119.3 |
| 3,601,442 | A | | 8/1971 | Orndorff, Jr. |
| | | | (Continued) | |

FOREIGN PATENT DOCUMENTS

| DE | 102012012289 A1 | 12/2012 |
| WO | 2014196928 A1 | 12/2014 |
| WO | 2015191585 A1 | 12/2015 |

OTHER PUBLICATIONS

International Search Report and Written Opinion of PCT/US2017/014281, dated Jun. 30, 2017, 15 pages.

*Primary Examiner* — Dean J Kramer

(57) ABSTRACT

Exemplary embodiments relate to unique structures for robotic end-of-arm-tools (EOATs). According to some embodiments, two or more fingers or actuators may be present on an EOAT, and the actuators may be connected to a hub through one or more sets of pivots attached to linkages that allow the distances between the pivots to be varied. Compared to conventional EOATs, exemplary embodiments increase the range of motion of the actuators, improve grip posture, boost gripping force, and balance the loads on the actuators.

20 Claims, 11 Drawing Sheets

Related U.S. Application Data application No. 15/411,212, filed on Jan. 20, 2017, now Pat. No. 10,179,411.

(60) Provisional application No. 62/584,399, filed on Nov. 10, 2017, provisional application No. 62/571,916, filed on Oct. 13, 2017, provisional application No. 62/280,802, filed on Jan. 20, 2016.

(51) Int. Cl.
*B25J 9/12* (2006.01)
*B25J 15/10* (2006.01)

(56) References Cited

U.S. PATENT DOCUMENTS

| | | | |
|---|---|---|---|
| 3,640,564 A | 2/1972 | Kuster | |
| 4,273,505 A | 6/1981 | Clark et al. | |
| 4,403,801 A * | 9/1983 | Huff | B25J 15/0023 294/119.3 |
| 4,547,121 A | 10/1985 | Nesmith | |
| 4,715,637 A * | 12/1987 | Hosoda | B25J 9/1085 294/106 |
| 4,770,456 A | 9/1988 | Phillips et al. | |
| 5,062,761 A | 11/1991 | Glachet | |
| 5,090,758 A | 2/1992 | Lord | |
| 5,125,789 A | 6/1992 | Farr | |
| 5,245,885 A | 9/1993 | Robertson | |
| 5,250,074 A * | 10/1993 | Wilk | A61B 17/12 606/158 |
| 5,385,080 A | 1/1995 | Suzumori | |
| 5,403,056 A | 4/1995 | Wallace | |
| 6,846,029 B1 | 1/2005 | Ragner et al. | |
| 7,475,927 B2 | 1/2009 | Maffeis | |
| 8,727,410 B2 * | 5/2014 | Jones | B25J 5/005 294/183 |
| 8,979,151 B2 | 3/2015 | Mukou | |
| 9,046,177 B2 * | 6/2015 | Tell | F16J 3/043 |
| 10,179,411 B2 * | 1/2019 | Lessing | B25J 15/0014 |
| 2006/0033350 A1 * | 2/2006 | Besch | B25B 5/065 294/119.3 |
| 2013/0232918 A1 * | 9/2013 | Lomerson, Jr. | B25J 15/0052 53/452 |
| 2015/0375404 A1 * | 12/2015 | Matsuoka | B25J 15/0023 294/86.4 |

* cited by examiner

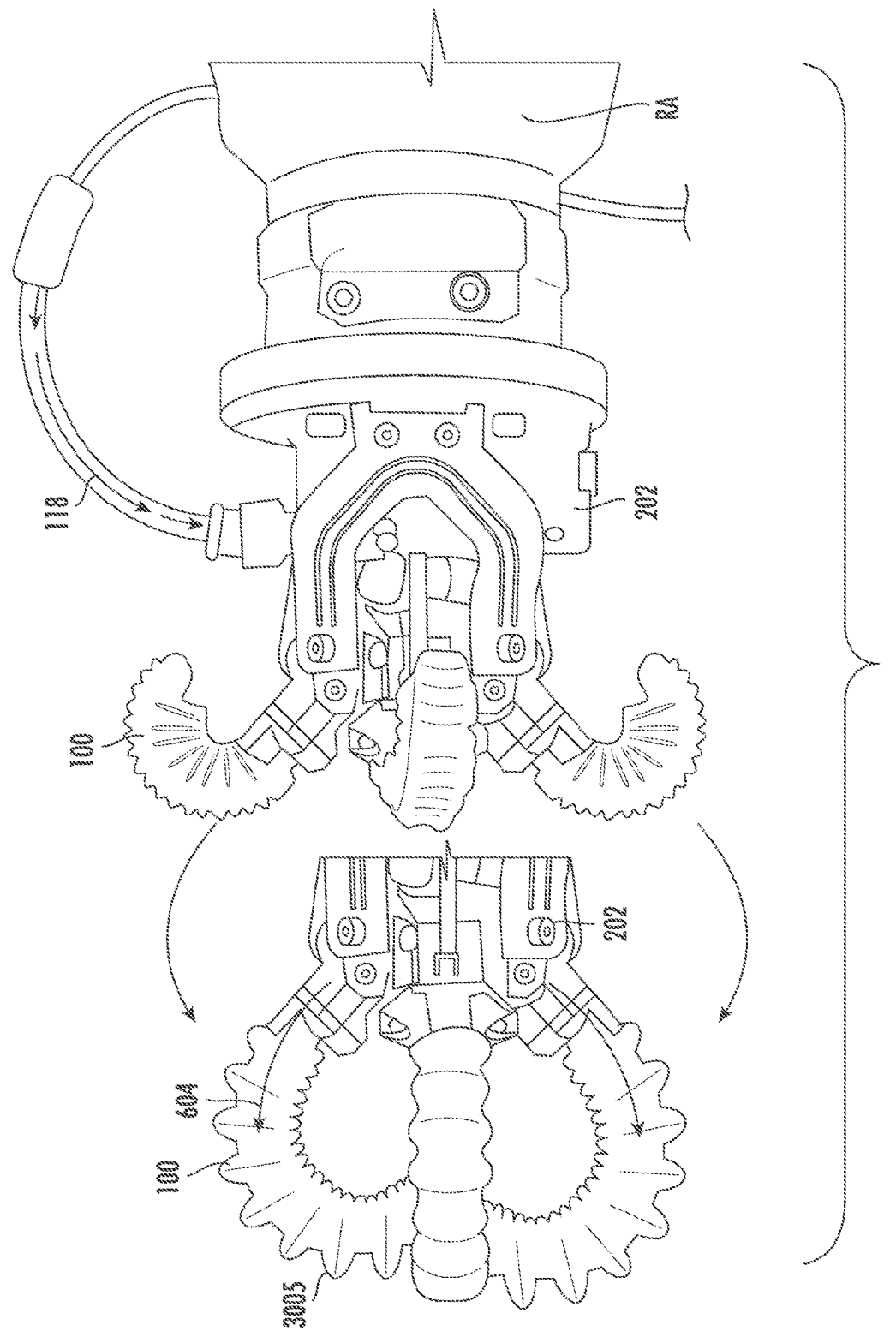

END OF ARM TOOLS FOR SOFT ROBOTIC SYSTEMS

RELATED APPLICATIONS

This application claims priority to U.S. Provisional Patent Application Ser. No. 62/584,399, filed on Nov. 10, 2017. This application is a continuation-in-part of, and claims priority to, U.S. patent application Ser. No. 16/160,580, filed Oct. 15, 2018, which claims priority to U.S. Provisional Patent Application Ser. No. 62/571,916, filed on Oct. 13, 2017, and is a continuation-in-part of, and claims priority to, U.S. patent application Ser. No. 15/411,212, filed Jan. 20, 2017, which claims priority to U.S. Provisional Patent Application Ser. No. 62/280,802, filed on Jan. 20, 2016. The contents of the aforementioned applications are incorporated herein by reference.

FIELD OF THE DISCLOSURE

The disclosure relates generally to the field of robotics and particularly to novel structures robotic end-of-arm tools.

BACKGROUND

Robotic graspers are increasingly used to automate the retrieval of items from a warehouse. Typically, a warehouse includes many shelves, each containing a number of bins or totes storing items (e.g., items offered for sale). When an order for items is received, the appropriate items are retrieved from the bins or totes and packaged together for shipment.

Due to the size and shape of the totes or bins, the size, weight, and shape of items in the totes or bins, the variability in size, weight, and shape of items in the totes or bins and due to the relatively tight storage constraints in a warehouse or an individual tote or bin, retrieving an item from one of the totes or bins may be difficult for conventional robotic systems. Often, robotic arms include bulky components, or systems extending laterally from the body of the robotic arm, which make it difficult to navigate confined spaces.

SUMMARY

Exemplary embodiments relate to apparatuses and methods for providing soft robotic grasping systems for grasping a target article. The system may include linkages and pivots connected by linear actuators that allow distances between the pivots to be adjusted.

The soft robotic grasping system may include a gripper hub having an axial center region about an axial center line. The gripper hub may extend from the axial center line in a lateral direction.

The soft robotic grasping system may further include a soft robotic finger supported by the hub. The soft robotic finger may include an elastomeric outer surface surrounding an internal void, and may be configured to curl when a pressure change occurs within the internal void.

The soft robotic grasping system may include a linkage extending from a proximal end of the soft robotic finger to the gripper hub. The linkage may be rotatably connected to the gripper hub at a pivot point. A linear actuator disposed between the pivot point and the proximal end of the soft robotic finger may move in the lateral direction under the control of a controller.

In some embodiments, the linkage may be connected to the linear actuator via a sliding pivot connected to the linear actuator. The sliding pivot may be connected to a rail along which the pivot can slide.

In some embodiments, two or more other soft robotic fingers, linkages, actuators, etc. may be provided in assemblies in order to form a gripper or end of arm tool. The linear actuator of the first assembly may be configured to move independently of the linear actuator of the first assembly, or may be configured to move in concert with each other with respect to the axial center line of the hub (e.g., moving towards or away from the hub by the same distance). In some embodiments, the controller may be configured to place the two assemblies in a narrowest possible configuration as the gripper hub approaches the target object to be grasped.

According to some embodiments, the linear actuator may be a lower linear actuator, and an upper linear actuator may also be provided, located at the pivot point. The upper linear actuator may be configured to move the pivot point in the lateral direction. The lower linear actuator and upper linear actuator may be controlled, by the controller, to balance a force on the linkages, or to amplify a force applied at the distal end of the soft robotic fingers.

BRIEF DESCRIPTION OF THE DRAWINGS

FIGS. 1A-1G depict various examples of soft robotic actuators.

DETAILED DESCRIPTION OF THE PREFERRED EMBODIMENTS

Figure 1A:
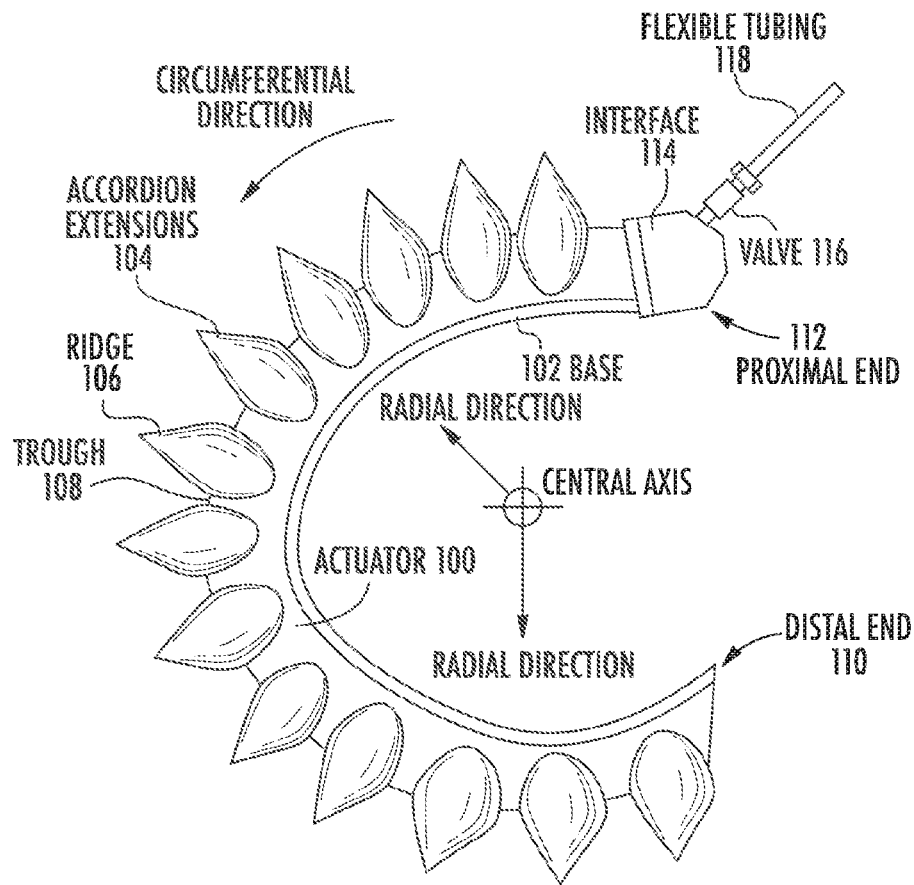

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding or bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
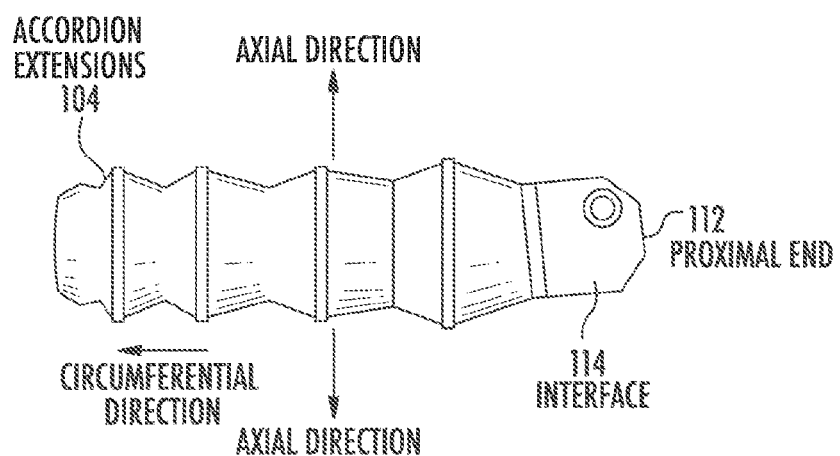
Figure 1C:
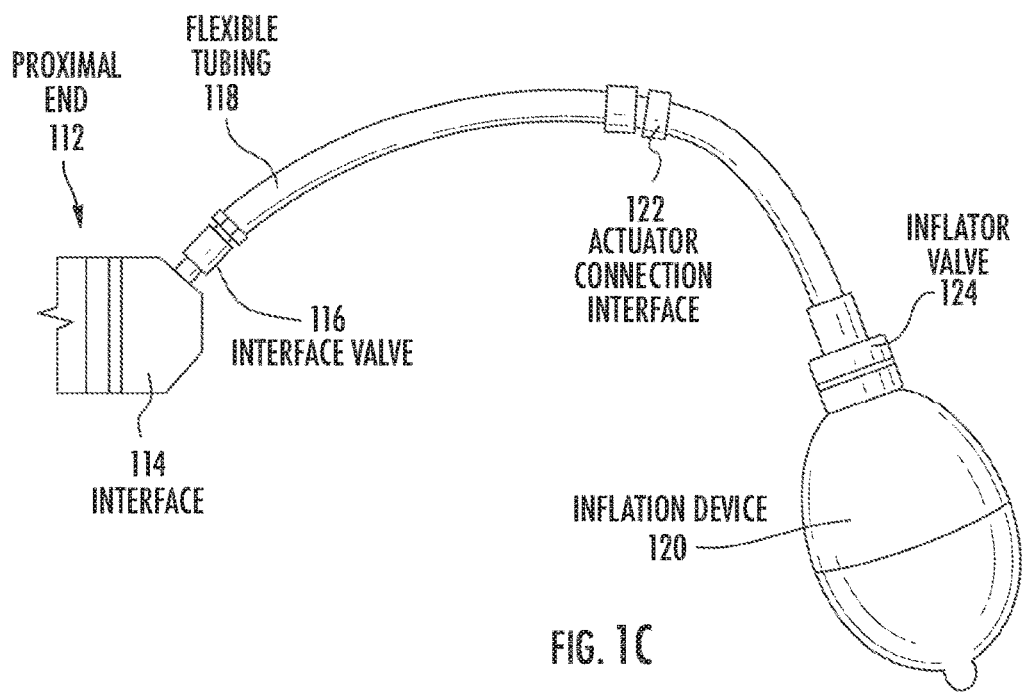
Figure 1D:
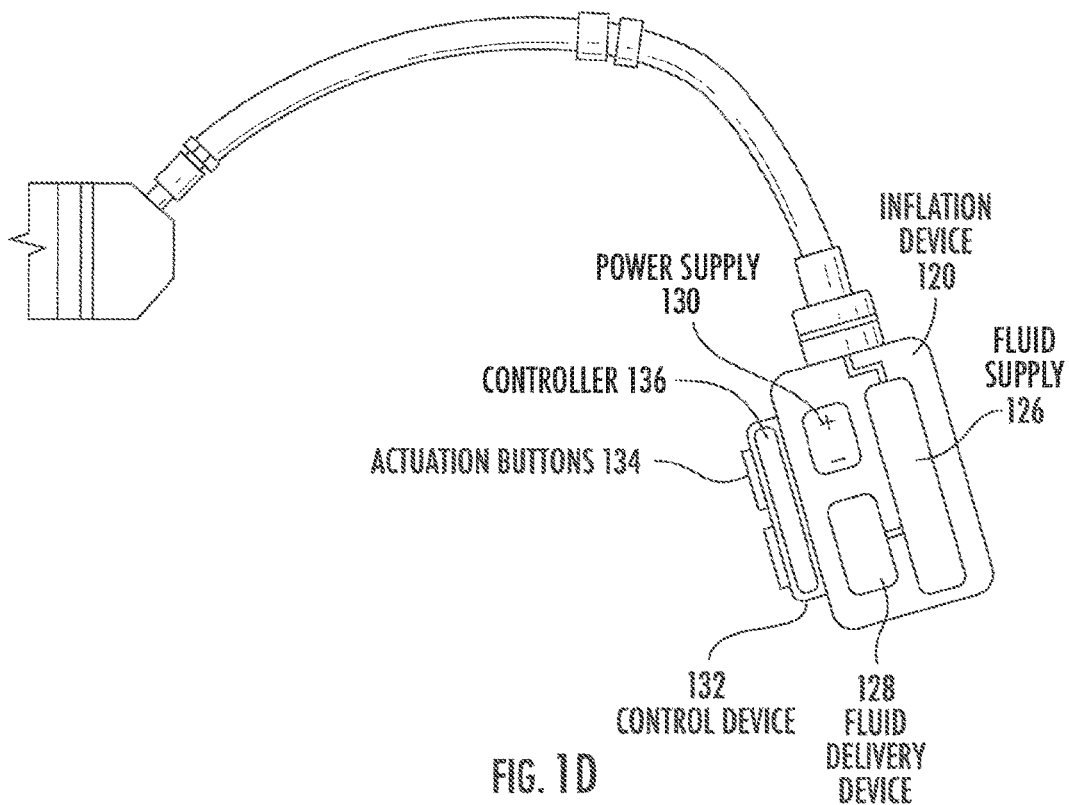

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, saline, or any suitable liquid, gas, gel, foam, etc. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated or deflated, and help to define the shape of the actuator 100 when in an inflated or deflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts. The interface 114 may be made of a food- or medically-safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch, an interface, a touch display, etc.). The control device 132 may include a controller 136 for sending a control signal to the fluid delivery device 128 to cause the fluid delivery device 128 to supply inflation fluid to, or withdraw inflation fluid from, the actuator 100.

Soft robotic actuators may be useful in many instances where a hard actuator is undesirable. For example, and without limitation, a soft actuator may pick up a packaging blank or preform and provide it to a blow molder, after which the blow molder may reshape the blank into the desired form based on the mold. After being shaped, the molded part will typically be quite hot and deformable. The molded part may be retrieved by the soft actuator without damaging or deforming the molded part. The actuator may then hold the molded part while it is being washed, labeled, filled, and/or capped. Other soft actuators may hold live animals gently, such as for inoculation, analysis or surgery.

One problem in conventional blow molding operations is that the object being grasped has a different shape before and after blow molding (transitioning form the packaging blank to the finally-formed product. Whereas a hard gripper may have difficulty adapting to the changing shape (thus perhaps requiring two different types of grippers for a single blow molding operation, a soft actuator may be sufficiently adaptable to grasp both object shapes using the same gripper.

Soft robotic actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of an object at a position or generally in contact with the actuator. Alternatively, the actuator may include touch sensors, bending sensors, or other types of detection devices for registering contact with an object.

FIG. 1E depicts a soft robotic actuator 100 with multiple fingers, in which the gripper hub 202 is attached to a robot arm RA, in which the fluid supply for actuation is provided via an external fluid line 118. The fingers 100 are shown in a reverse curled position and curled in the direction 604.

Figure 1F:
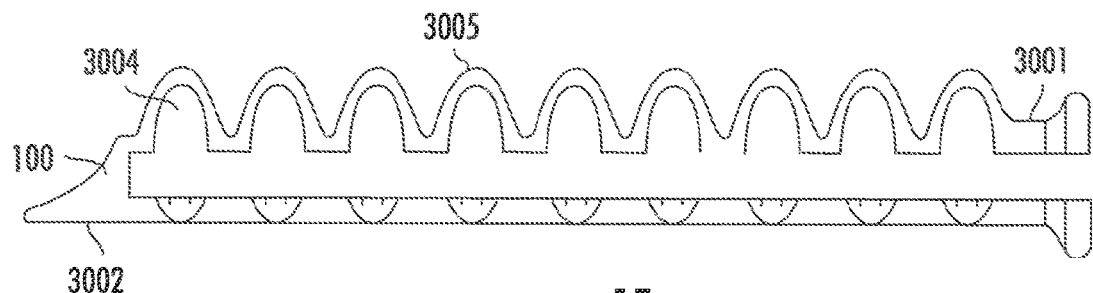
Figure 1G:
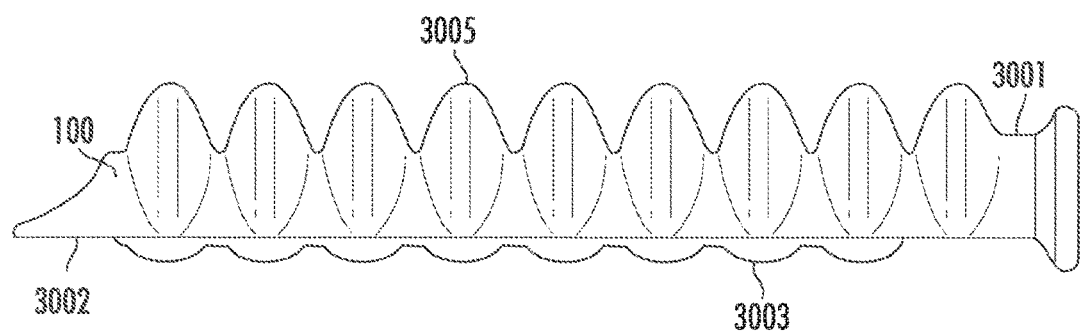

FIGS. 1F and 1G depict a soft robotic actuator finger 100 that may be used with any embodiment discussed herein. Each finger 100 or actuator 100 includes an elastomeric outer surface 3005 surrounding an internal void 3004, and the is configured to curl when an inflation fluid is supplied to the internal void 3004. A strain-limiting side 2003 resists extension while the expanding side 3001 includes bellows features to promote extension as well as contraction upon a change in fluid pressure, either extension or contraction causing curling in one direction or another. Reinforcing ribs 3003 constrain expansion and contraction to occur primarily along the curling direction, and also provide some texture or ridges for grasping.

FIGS. 1A-1G depict a particular type of soft robotic actuator, sometimes referred to as an accordion-type soft actuator. However, numerous other types of soft actuators exist, some of which are described in connection with particular embodiments below. Soft actuators include actuators formed partially or entirely from soft or compliant materials, and may incorporate or surround more conventional hard actuator materials.

Soft actuators may move in a variety of ways. For example, soft actuators may bend, as shown above, or may twist, as in the example of the soft tentacle actuator described in U.S. patent application Ser. No. 14/480,106, entitled "Flexible Robotic Actuators" and filed on Sep. 8, 2014. In another example, soft actuators may be linear actuators, as described in U.S. patent application Ser. No. 14/801,961, entitled "Soft Actuators and Soft Actuating Devices" and filed on Jul. 17, 2015. Still further, soft actuators may be formed of sheet materials, as in U.S. patent application Ser. No. 14/329,506, entitled "Flexible Robotic Actuators" and filed on Jul. 11, 2014. In yet another example, soft actuators may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

One of ordinary skill in the art will recognize that other configurations and designs of soft actuators are also possible and may be employed with exemplary embodiments described herein.

End Effectors

An end effector may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool. While grippers tend to hold, lift, transport and/or manipulate objects, tool functions often have a contrasting function, and may change a characteristic of the work object rather than gripping or holding it. Tool functions may include welding or fusing, spraying, dispensing, milling, screw or nut driving, flattening, cutting, and combinations of these.

At least four categories of end effector include impactive (e.g., jaws, claws, grasping a work object by direct impact, including holding friction); ingressive (e.g., penetrating the work object with needles, pins, or hackles); astrictive (e.g., essentially attractive or field forces such as Bernouilli lift, suction force, vacuum force, magnetic, electrostatic, van der Waals', ultrasonic standing waves, laser tweezing), and contigutive (e.g., essentially adhesive forces via capillary action, glue, surface tension, freezing, chemical reaction).

In hard robotics, gripping may performed by using a form-following static shape in the gripping surface (e.g., a concave cup to lift a round object), or by friction force increased by closing hard fingers, jaws or claws. A soft robotic end effector may include gripper functionality, and may also or alternatively include some tool functionality. Soft robotic grippers may be impactive, and may additionally be made ingressive, astrictive, and/or contigutive via a particular gripper/actuation morphology or configuration, or by adding an accessory tool within or along or opposite the soft robotic gripper.

A soft robotic gripper may include one or more soft robotic members, which may take organic prehensile roles of finger, arm, tail, or trunk, depending on the length and actuation approach. In the case of inflating and/or deflating soft robotic members, two or more members may extend from a hub, and the hub may include a manifold for distributing fluid (gas or liquid) to the gripper members and/or a plenum for stabilizing fluid pressure to the manifold and/or gripper members. The members may be arranged like a hand, such that the soft robotic members act, when curled, as digits facing, a "palm" against which objects are held by the digits; and/or the members may also be arranged like an cephalopod, such that the soft robotic members act as arms surrounding an additional central hub actuator (suction, gripping, or the like). Generally, although not exclusively, as used herein, the terms "base plate", "palm plate", "bumper plate", or "hub plate" may refer to a reference surface adjacent two or more soft robotic members against which the soft robotic member may hold a work object, e.g., when curled in a "closing" direction, and from which the grip of the soft robotic members on the work object may be released, e.g., when the soft robotic members are curled or recurled in an "opening" direction. The use of "plate" does not suggest that the member is fully planar—"plates", unless otherwise described, may have surface relief, contour, curves, peaks and valleys, texture, or the like—a "plate", unless otherwise described, describes a member fitting within a plate-like envelope or aspect ratio.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

Exemplary End-of-Arm-Tools

Exemplary embodiments described herein relate to end-of-arm tools (EOATs) having various adjustable components. One or more actuators may be mounted to linkages that are connected to a hub and/or rail system at one or more pivot points. The pivot points may be capable of moving (e.g., linearly) to adjust a distance between the pivot points. By moving the pivot points, the EOAT can: adjust the range of motion of the actuators; improve the grip posture of the actuators so as to be able to grasp targets of different sizes, shapes, or properties; boost the gripping force at the actuators; and/or balance the loads on the actuators.

Figure 2:
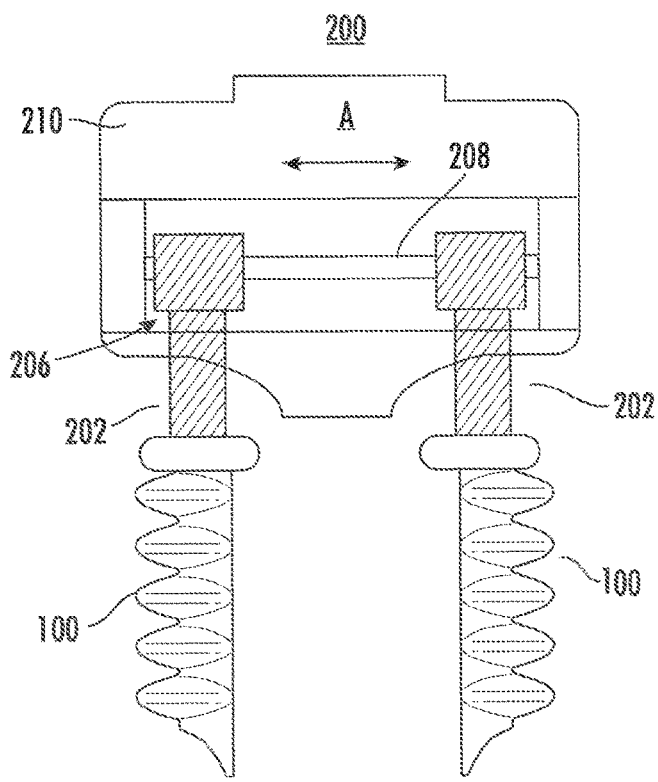
FIGS. 2, 3A, and 3B depict side views of a robotic end-of-arm tool (EOAT).
Figure 3A:
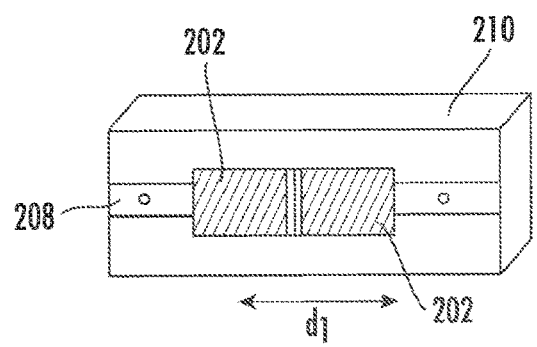
Figure 3B:
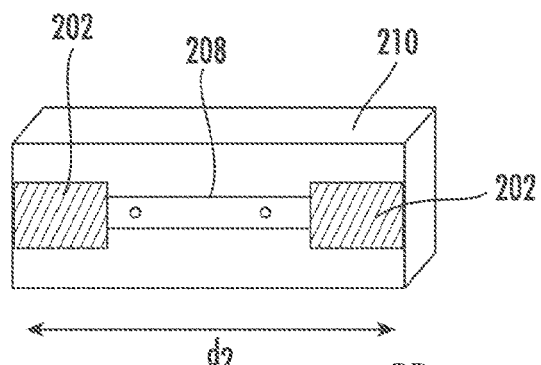

For example, FIGS. 2 and 3A-3B depict an exemplary EOAT 200 according similar in principle to the one described in U.S. patent application Ser. No. 16/160,580, filed on Oct. 15, 2018. The EOAT 200 includes two soft actuators 100, each mounted to a jaw 202 that is connected to a mechanical actuator 206 inside of a hub 208 of the EOAT 200.

The mechanical actuator 206 may include a motor, which may be mounted to one or more rails 208. A geared mechanism on the rails may mate with corresponding gears of the motor. When the motor is driven in one direction, the motion of the gears may cause the geared rails 208 to move apart, pushing the jaws 202 away from each other in the direction of the arrow A (see, e.g., FIG. 3A, in which the jaws 202 are separated from each other by a first distance d1). When the motor is driven in a different direction, the motion of the gears may cause the geared rails to move closer together, pushing the jaws 202 apart (see, e.g., FIG. 3B, wherein the jaws 202 have been driven apart by the actuator 206 so that they are positioned at a second distance d2 larger than the first distance d1).

In the embodiments depicted in FIGS. 2-3B, when the distance between the jaws 202 is adjusted, the actuators 100 remain parallel to each other. This may be desirable for some applications, but for others it may be helpful to allow the actuators 100 to adjust into a non-parallel position.

Figure 4:
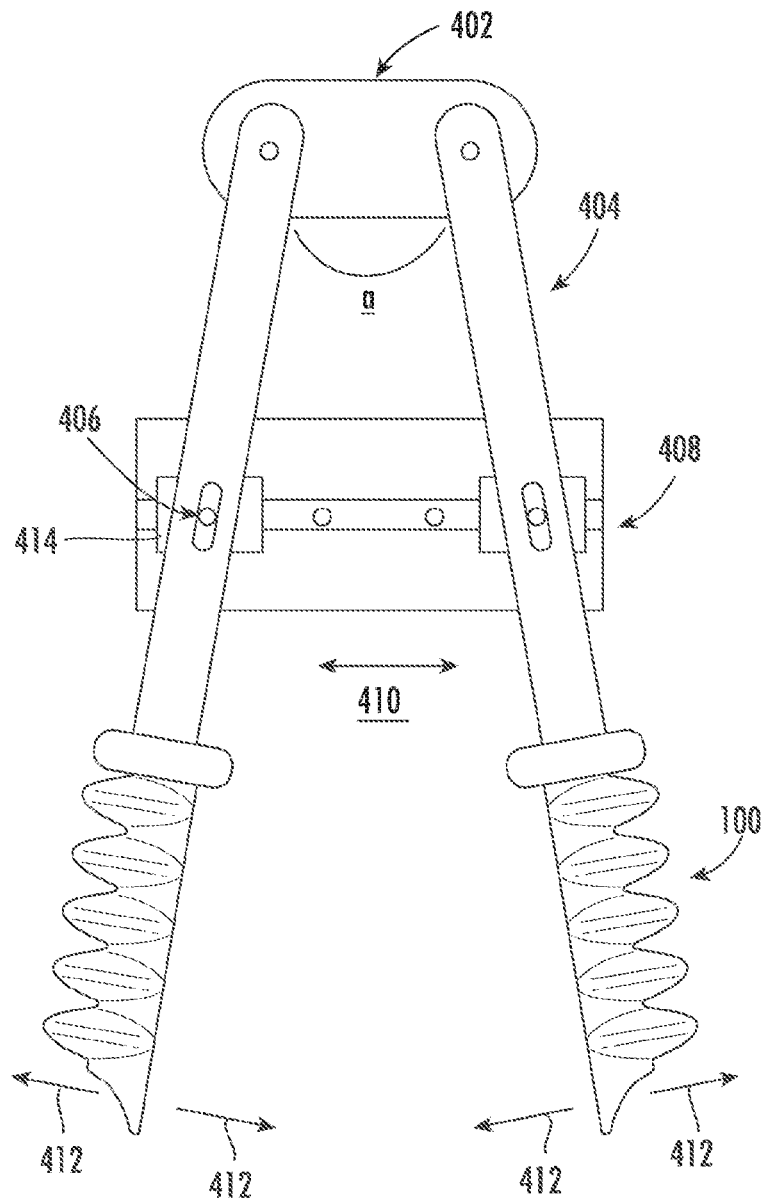
FIG. 4 depicts an exemplary EOAT according to a first embodiment.

For instance, FIG. 4 depicts an exemplary embodiment in which each actuator 100 is connected to a linkage 404 affixed to the hub by a pivot pin 402. The pivot pin 402 allows the linkage 404 to rotate about the pin 402. Although FIG. 4 depicts each actuator 100 connected to a pivot pin 402 by the linkage 404, in some embodiments one or more actuators 100 may be mounted via a pivot pin 402 and others may be held to the hub in a fixed configuration so that they cannot pivot.

The linkages 404 may also each be connected to a sliding pivot 406 (or, in some embodiments, only some of the linkages may be connected to the sliding pivot 406). The sliding pivot 406 may be driven by an actuator 414 (similar to the actuators 206 described above) and connected to a rail 408 (similar to the rail 208 described above). The sliding pivots' actuators 414 are not limited to using a motor and rails, but may be actuated by any suitable technique. For example, in one embodiment a pneumatic system, such as a pneumatic linear actuator, is operable to receive a pneumatic fluid, such as air, in order to drive apart the sliding pivots 406 as they are guided along the guide rails 408, or to eject the fluid in order to drive the sliding pivots 406 together as they are guided along the guide rails 408. A pneumatic fluid supply tube may deliver the pneumatic fluid to or from the actuator. It is noted that different valving systems can be used to control motion of the pneumatic system. Alternatively or in addition to a pneumatic system, the gripper may be hydraulically adjustable via a hydraulic fluid.

In another embodiment, each sliding pivot 406 may be connected to an actuator 414 that is independently controllable, so that the sliding pivots 406 may be adjusted independently. In either embodiment, the sliding pivots 406 may be configured to move in the same direction upon motion of the actuators 414 (e.g., moving both sliding pivots 406 to the left or to the right in FIG. 4 by the same amount). Still further, the sliding pivots 406 may be configured to move in the same or different directions, but to a different degree (e.g., with one sliding pivot 406 moving more than the other, or one sliding pivot 406 moving while the other remains still).

In the configuration depicted in FIG. 4, the distance between the sliding pivots 406 can be adjusted by driving the pivots' actuators 414 along the rail 408 in the direction of the arrow 410. Because the linkages 404 are connected to the pivot pins 402, an angle α between the linkages 404 is also adjusted, which moves the actuators 100 in the direction of the arrows 412.

This configuration allows the actuators 100 to be adjusted to a relatively wider grasping stance than would be possible if the actuators 100 were to remain parallel. Furthermore, depending on the shape of the object to be grasped, providing a non-parallel angle for the actuators 100 may allow for more of the gripping surface provided on the internal side of the actuator 100 to be exposed to the object being grasped (thus improving the grip strength).

Rather than grasping an object, the pivots 406 may be driven apart in order to cause the actuators 100 to perform a sweeping motion in order to drive objects out of the way (e.g., in order to clear space around a target object to be grasped in a crowded bin). This action may be accompanied by reverse actuation of the actuators 100 to cause the actuators 100 to bend outwardly.

Furthermore, the sliding pivots 406 may be driven separately or in conjunction with actuating the actuators 100 to grasp the target object. When driven separately from actuation of the actuators 100, the motion of the sliding pivots 406 may push the actuators 100 directly into the object to be grasped while the actuators remain in a neutral position (which, again, may serve to expose more of the gripping surface of the actuator 100). When driven in conjunction with actuation of the actuators, the motion of the sliding pivots 406 may cause the tips of the curled actuators 100 to make more forceful contact with the object to be grasped, thus allowing for increased force exerted over a relatively small area (as compared to the situation where the grasping force is spread out over the internal surfaces of the actuators 100).

Figure 5:
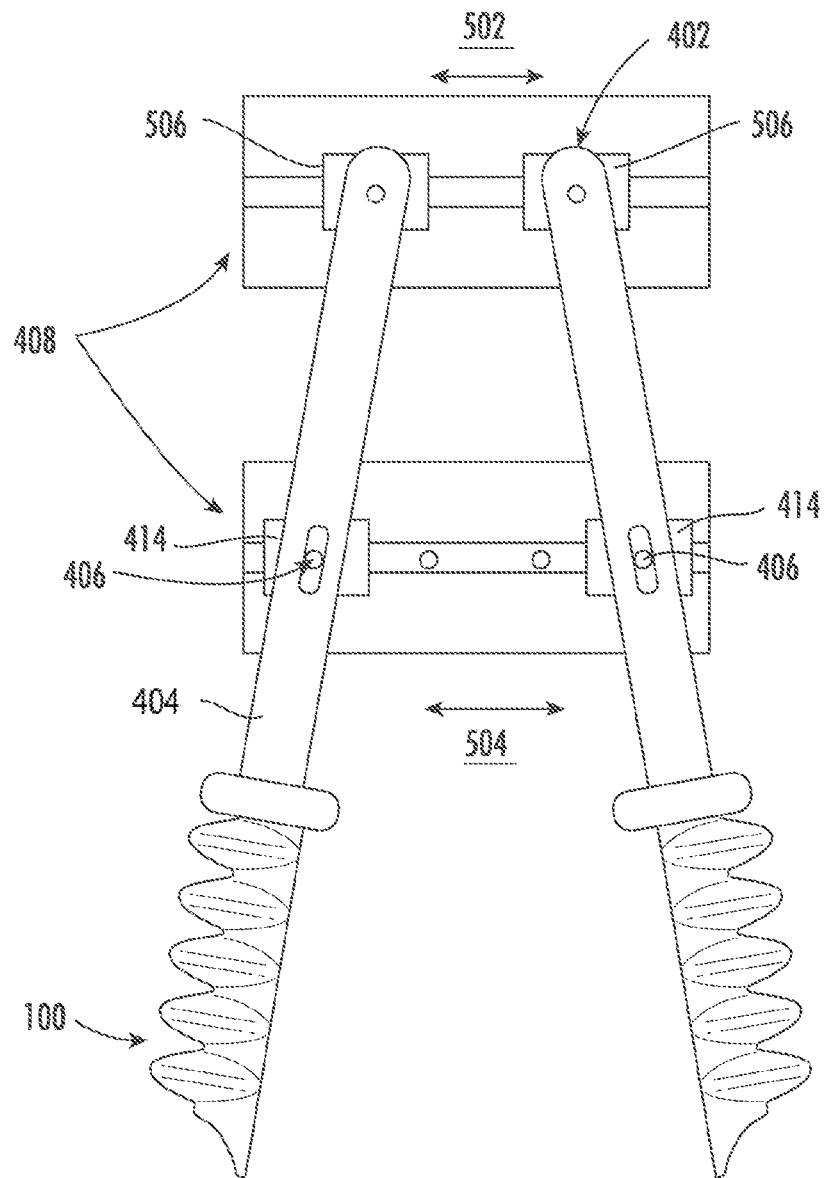
FIG. 5 depicts an exemplary EOAT according to a second embodiment.

In another embodiment, as depicted in FIG. 5, the pivot pins 402 may also be attached to actuators 506 (similar to the actuators 414) and mounted to a rail system 408 to allow the upper part of the linkages 414 to be moved closer together or further apart (as indicated by the arrow 502). This motion may be performed in conjunction with, or separately from, the motion of the lower actuators 414 (as indicated by the arrow 504).

In this configuration, the actuator 100 range of motion and grip posture can be changed, similarly to the configuration described above in connection with FIG. 4 (although the inclusion of the upper actuators 506 may allow for a greater range of motion and/or finer control as compared to the embodiment of FIG. 4).

Figure 6B:
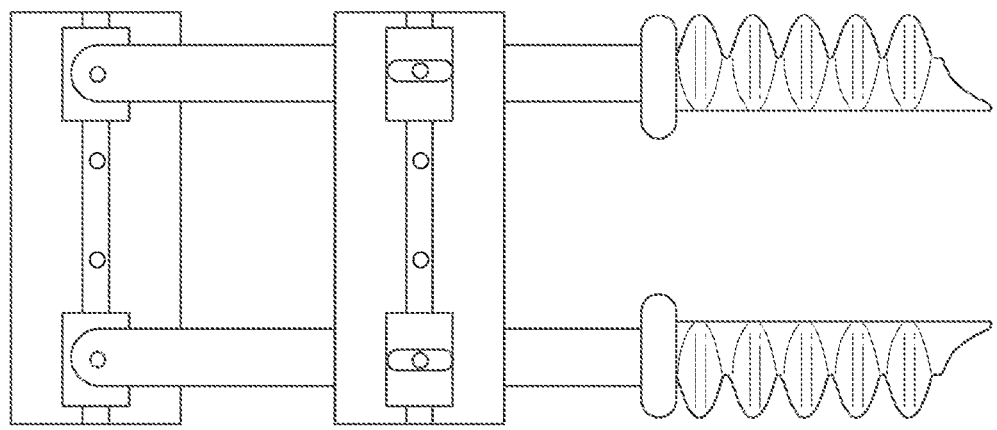
FIGS. 6A-6B depict an exemplary EOAT in a closed and open configuration, respectively.
Figure 6A:
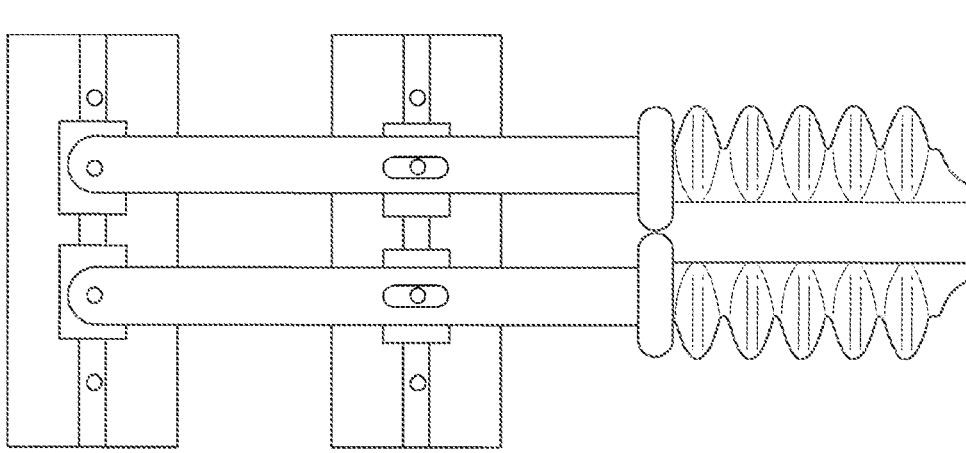

In addition, this configuration allows for two modes of operations, in which the actuators 100 can be maintained in a parallel or non-parallel position, as desired. By driving only the lower actuators 414 or the upper actuators 506, or by driving the actuators 414, 506 to different degrees, the actuators 100 can be moved into a non-parallel position. On the other hand, if the upper and lower actuators 506, 414 are moved together (as shown in FIGS. 6A-6B), the actuators 100 can be moved in a parallel configuration. This provides additional flexibility in presenting the actuators 100 to a grasp target, which may allow for a wider range of sizes, weights, textures, or positions of target objects to be grasped.

As noted above in connection with FIG. 4, the sliding pivots 406 may be used to drive the actuators 100 towards each other to improve the actuators' grip on an object. This technique can also be used when the actuators 100 are positively inflated in order to adjust or maintain grip force control. For example, if the EOAT detects that the grasp on the target object is loosening, the EOAT could supply additional inflation fluid to the actuators 100, but could also or alternatively move the sliding pivots 406 closer together. Similarly, if it appears that an object is being held too rigidly (e.g., it appears as though it might become damaged), the EOAT can deflate the actuators 100 and/or move the sliding pivots 406 further apart.

Figure 7C:
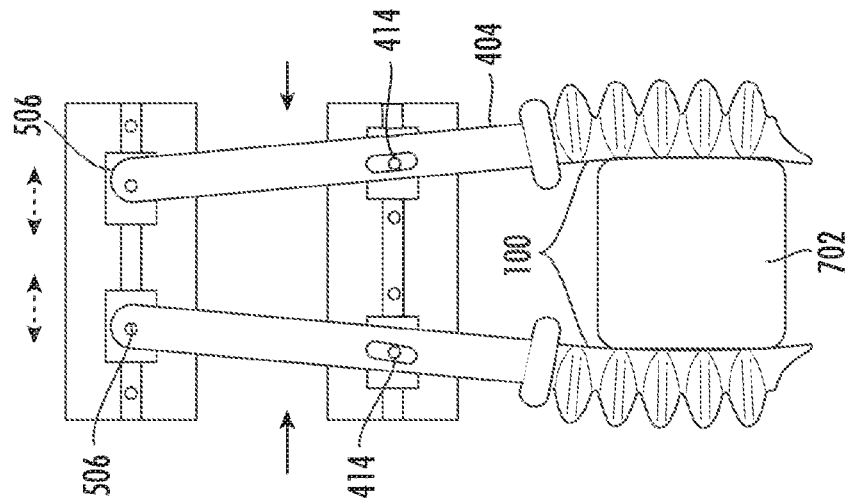
FIGS. 7A-7C depict an exemplary grasping procedure.

To take this example a step further, the presence of the sliding pivot 406 also allows for other types of unique control schemes. For example, FIGS. 7A-7C depict an embodiment in which the distance between the sliding pivots 406 is adjusted to maintain an optimized grip on a target object 702.

Figure 7B:
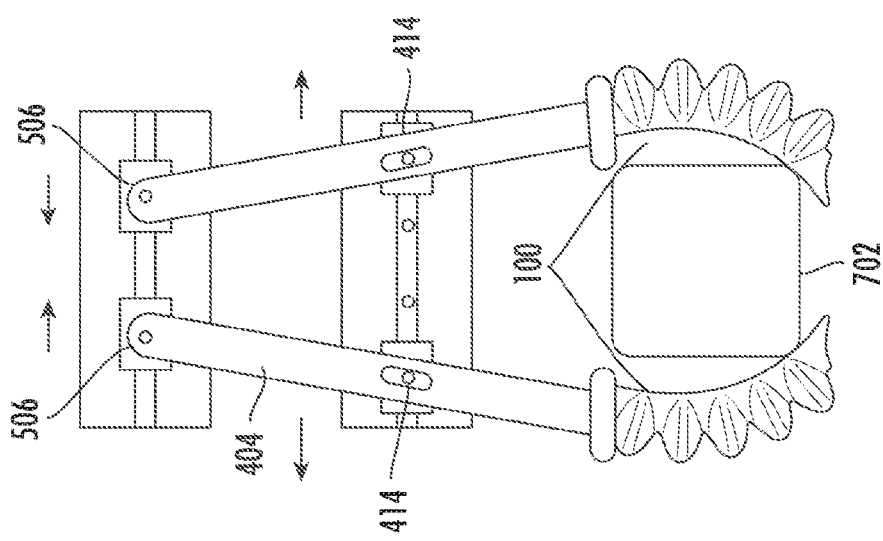
Figure 7A:
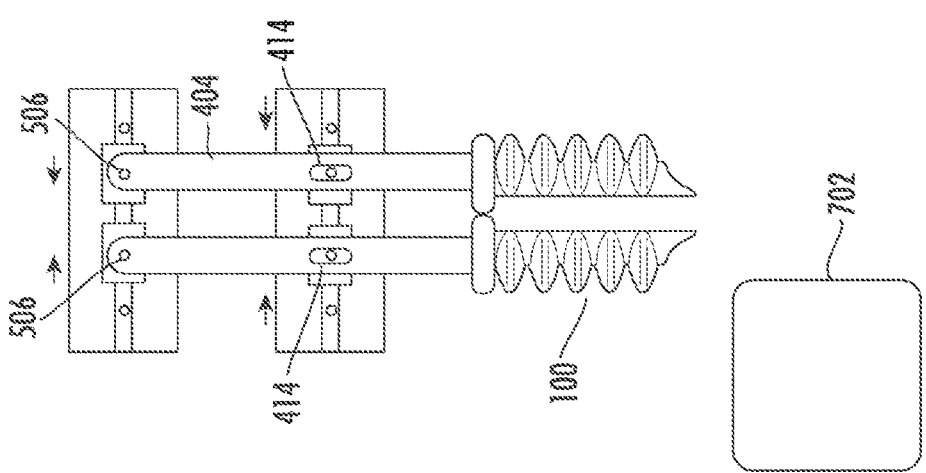

In FIG. 7A, the actuators 100 held in a parallel position as they approach a target object 702. The parallel position may be achieved by aligning the upper actuators 506 with the lower actuators 414. Moreover, the upper and lower actuators 506, 414 may be moved as close as possible together. This configuration may allow for the EOAT to present the narrowest profile possible to the target object 702, which allows the EOAT to approach into relatively confined spaces where a wider EOAT (e.g., an EOAT with the actuators 100 in a non-parallel configuration) might not be able to approach.

Upon moving into a suitable position over the target object 702, the lower actuators 414 may be moved apart and/or the upper actuators 506 may be moved together, as shown in FIG. 7B. This action pushes the actuators 100 out and into a non-parallel configuration, widening the grip of the actuators and allowing the EOAT to grasp a relatively wide target object 702. The actuators 100 may then be driven together by pushing the upper actuators 506 outward (creating a scissor motion) and/or by pushing the lower actuators 414 inward. The actuators 100 may also be actuated in order to curl them inwardly and cause the actuator 100 tips to make initial contact with the target object 100.

In this state, the actuators 100 exert a force $F_a$ on the target object, which results in an opposing outward force $F_a$ on the linkages 404. Simultaneously, the upper and/or lower actuators 506, 414 may be configured to maintain an inward force $F_j$ on the linkages 404. As the actuators 100 are inflated more substantially in order to maintain a stronger grip on the target object 702, the linkages 404 are pushed further apart and the lower actuators 414 counter by moving inwardly to generate a stronger force $F_j$ (and vice versa). The force $F_j$ may also be affected by movement of the upper actuators 506 (which may provide finer control than is possible by the lower actuators 414 due to the fact that the upper actuators 506 are located relatively further away from the center of rotation of the linkage 404). A controller may attempt to maintain the force $F_j$ such that $F_j \geq F_a$ by moving the upper actuators 506; optionally, the lower actuators 414 may also be controlled by the controller if a stronger correction amount is needed. Accordingly, the EOAT provides a self-leveling or self-optimizing grip on the object 702 as equilibrium is reached between the actuator 506, 414 spacings and the actuator 100 grip posture on the object 702.

Figure 8:
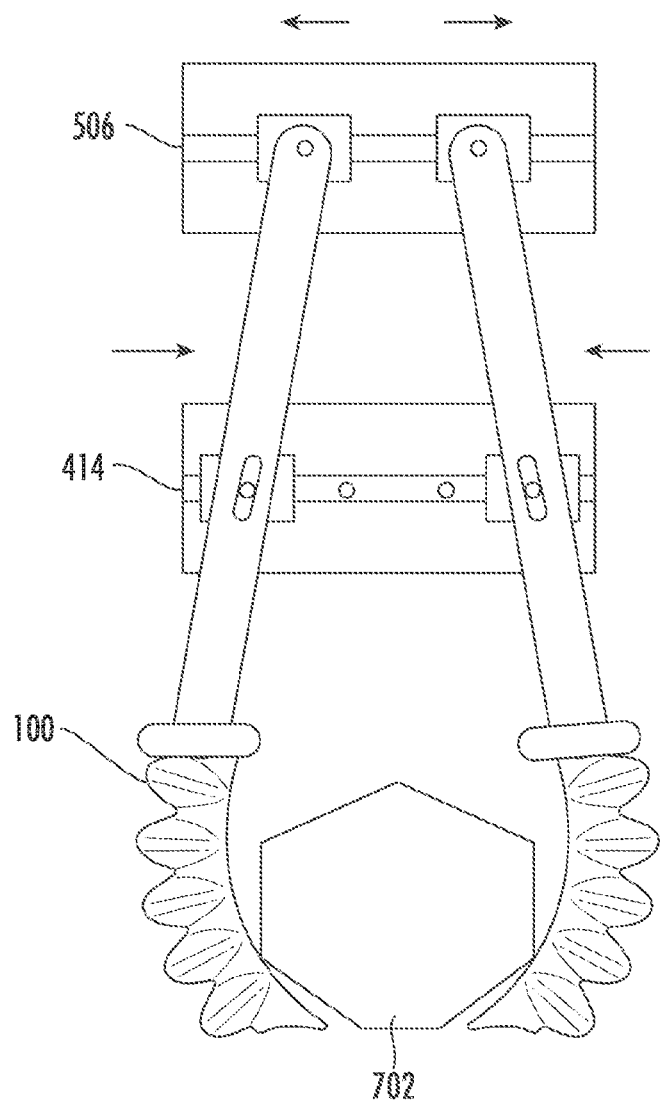
FIG. 8 depicts an exemplary self-balancing technique.

In another embodiment, the actuators 506, 414 may be driven to increase the grasping force applied to the target object 702. For example, FIG. 8 depicts a situation in which the upper actuators 506 are driven apart, while the lower actuators 414 are driven together. This increases the amount of force applied at the distal tips of the actuators 100.

Grasping Method

Figure 9:
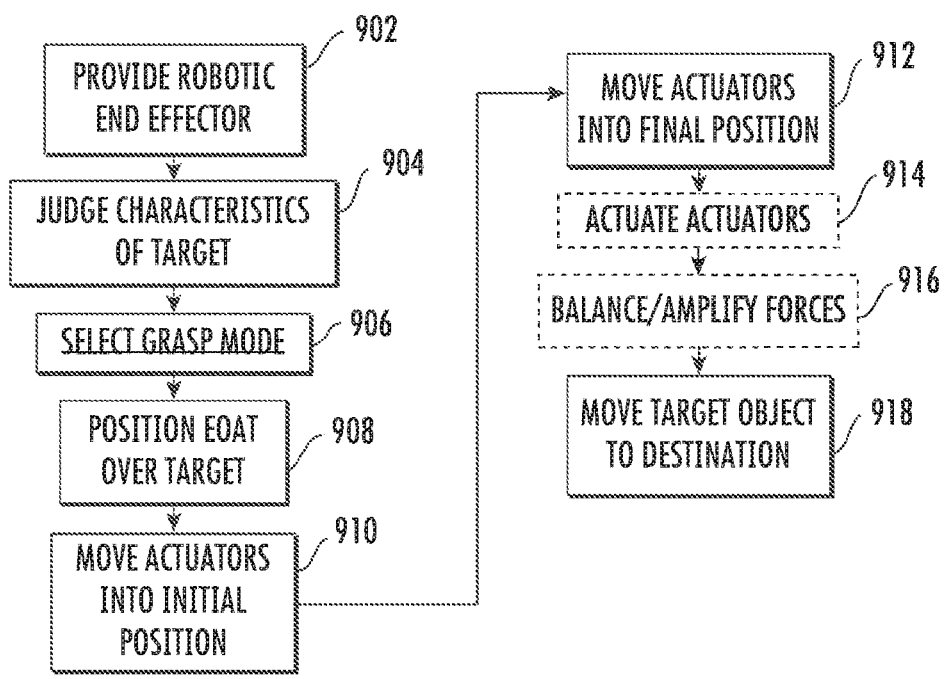
FIG. 9 is a flowchart describing an exemplary grasping technique in accordance with exemplary embodiments.

FIG. 9 describes a procedure for deploying and using an end effector as described above. In FIG. 9, blocks surrounded by dashed lines represent optional steps.

At block 902, a robotic end effector may be provided and affixed to a robotic system (e.g., a robotic arm). The robotic end effector may be a robotic end effector as depicted and described herein.

At block 904, the system may judge characteristics of a target object to be grasped. These characteristics may include: the distance to the target object; the size, shape, or configuration of the target object; a type of the target object (as detected, e.g., by object recognition as described above); properties of the target object (as received, e.g., from an object library or database as described above); etc.

At block 906, the system may select a grasp mode for the target object based on the characteristics identified in block 904. Grasp modes may include, for instance, a first grasp mode in which the actuators grasp the target object in a parallel configuration, and a second grasp mode in which the actuators grasp the target object in a non-parallel configuration. These grasp modes may be selected, for example, based on the shape or surface texture of the object. A third grasp mode, which may be used separately or in conjunction with the first or second grasp modes, may involve providing force balancing as described above. This grasp mode may be useful for relatively delicate or fragile objects. A fourth grasp mode, which may be used separately or in conjunction with the first or second grasp modes, may involve providing force amplification as described above. Such a grasp mode may be used if the object is determined to be relatively hard, rigid, or heavy.

At block 908, the EOAT may be moved into proximity with the target object. In some embodiments, this may involve making contact with the target object, while in others the EOAT may be moved to within a predetermined distance of the target object. The distance selected may be dependent upon the grasp mode selected in block 906. The movement of the EOAT may be guided by various sensors, such as proximity sensors, cameras, touch sensors, etc. In some embodiments, the EOAT may be positioned in this block so as to be relatively centered over an axis of the target object. The axis of the target object may represent a grasping axis along which the actuators may be arrayed (e.g., along a long axis of the bumper plate when the object is grasped).

At block 910, the linear actuators and/or finger actuators may be moved into an initial position, which may be dependent upon the grasp mode selected at block 906. For example, the upper and/or lower linear actuators may be moved to an initial position that positions the linkages and finger actuators in a narrowest possible configuration as the EOAT is moved into position near the target object. In some embodiments, the position of the linear actuators 414, 506 and/or the inflation status of the finger actuators 100 may be manipulated as the EOAT moves through the environment (e.g., narrowing a profile of the EOAT to fit into a relatively tight space before extending the jaws and/or actuators). Block 910 may be performed in conjunction with or before block 908, as required by the situation.

At block 912, the system may move the linear actuators 414, 506 into a final grasping position. The final grasping position may be a position of the linkages as the target object is grasped, and may depend on the grasp mode selected in block 906. For instance, the system may position the upper linear actuators relatively close together and/or the lower linear actuators relatively far apart to provide a wider range of motion or a relatively wide grip posture. In another embodiment, the system may position the upper linear actuators relatively far apart and/or the lower linear actuators relatively close together to narrow the grip posture or provide a more limited range of motion.

At block 914, the system may optionally actuate the actuators 100 to cause them to curl and grasp the target object. Depending on the grasp mode selected, the degree of curl may be controlled by a controller by adding or subtracting more or less inflation fluid to the actuators 100 (e.g., with more curl resulting in a firmer grasp for relatively hard objects, or less curl resulting in a looser grasp for relatively fragile objects). In some embodiments, the actuators 100 may be maintained in a neutral or even negatively-inflated position, and may be pushed into the target object through action of the linear actuators.

At block 916, the system may optionally control the linear actuators to amplify the forces applied by the linear actuators, and/or to balance the forces on the linkages to optimize the gripper strength.

Having thus secured the target object in the grip of the EOAT, at block 918 the EOAT may be translated and/or rotated to move the target object to a desired destination or configuration.

The above-described method may be embodied as instructions or logic stored on a non-transitory computer-readable medium. When executed, the instructions or logic may cause a processor circuit to perform the above-described method using a robotic system.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Any or all of the above-described techniques may be implemented by suitable hardware, including pneumatic, hydraulic, mechanical, electrical, magnetic, etc. hardware. Some embodiments may utilize logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

As used herein, structures, acts, steps, and functions are given various names or labels. This paragraph describes terminology that is used alternatively, in some cases interchangeably, and in some cases equivalently. Generally, one of skill in the art will recognize and understand identity, equivalency, and the similarities and differences among alternative terms of art and/or words having a plain technical meaning. As used herein, an end effector may include an effector including a tool or one to which a tool may be mounted, including EOAT 202 and the like. Bendable members may include soft robotic members such as soft robotic actuators 100.

We claim:

1. A soft robotic grasping system for grasping a target object, comprising:
    a gripper hub having an axial center region about an axial center line, the gripper hub extending from the axial center line in a lateral direction;
    a soft robotic finger supported by the hub, the soft robotic finger including an elastomeric outer surface surrounding an internal void, and configured to curl when a pressure change occurs within the internal void;
    a linkage extending from a proximal end of the soft robotic finger to the gripper hub;
    a pivot point at which the linkage is rotatably connected to the gripper hub;
    a linear actuator disposed between the pivot point and the proximal end of the soft robotic finger and configured to move in the lateral direction; and
    a controller configured to actuate the linear actuator to move the linear actuator in the lateral direction.

2. The soft robotic grasping system of claim 1, wherein the linkage is connected to the linear actuator via a sliding pivot, the sliding pivot connected to the linear actuator.

3. The soft robotic grasping system of claim 2, wherein the sliding pivot is connected to a rail along which the sliding pivot is configured to slide.

4. The soft robotic grasping system of claim 1, further comprising a second soft robotic finger provided across the axial center line from the soft robotic finger, the second soft robotic finger attached via a second linkage to a second linear actuator.

5. The soft robotic grasping system of claim 4, wherein the linear actuator and the second linear actuator are configured to move independently of each other.

6. The soft robotic grasping system of claim 4, wherein the linear actuator and the second linear actuator are configured to move in concert with each other with respect to the axial center line.

7. The soft robotic grasping system of claim 4, wherein the controller is configured to place the linear actuator and the second linear actuator in a narrowest configuration as the gripper hub approaches a target object to be grasped.

8. The soft robotic grasping system of claim 1, wherein the linear actuator is a lower linear actuator, and further comprising an upper linear actuator located at the pivot point and configured to move the pivot point in the lateral direction.

9. The soft robotic grasping system of claim 8, wherein the lower linear actuator and the upper linear actuator are controlled by the controller to balance a force on the linkage.

10. The soft robotic grasping system of claim 9, wherein the lower linear actuator and the upper linear actuator are controlled by the controller to amplify a force applied by a distal end of the soft robotic finger.

11. A method comprising:
    providing the soft robotic grasping system of claim 1; and
    applying the controller to move the linear actuator in the lateral direction.

12. The method of claim 11, wherein the linkage is connected to the linear actuator via a sliding pivot, the sliding pivot connected to the linear actuator, and further comprising sliding the sliding pivot by actuating the linear actuator.

13. The method of claim 12, wherein the sliding pivot is connected to a rail along which the sliding pivot is configured to slide, and further comprising sliding the sliding pivot along the rail.

14. The method of claim 11, wherein the linkage is a first linkage, and further comprising a second soft robotic finger provided across the axial center line from the soft robotic finger, the second soft robotic finger attached via a second linkage to a second linear actuator, and further comprising moving the linear actuator and the second linear actuator to alter an angle between the first linkage and the second linkage.

15. The method of claim 14, further comprising moving the linear actuator and the second linear actuator independently of each other.

16. The method of claim 14, further comprising moving the linear actuator and the second linear actuator in concert with each other with respect to the axial center line.

17. The method of claim 14, further comprising placing the linear actuator and the second linear actuator in a narrowest configuration as the gripper hub approaches a target object to be grasped.

18. The method of claim 11, wherein the linear actuator is a lower linear actuator, and further comprising an upper linear actuator located at the pivot point, and further comprising moving the pivot point in the lateral direction by action of the upper linear actuator.

19. The method of claim 18, further comprising balancing a force on the linkage by moving the lower linear actuator and the upper linear actuator.

20. The method of claim 19, further comprising amplifying a force applied by a distal end of soft robotic finger by moving the lower linear actuator and the upper linear actuator.

\* \* \* \* \*